US005292364A

United States Patent [19]

Hiraiwa et al.

[11] Patent Number: 5,292,364
[45] Date of Patent: Mar. 8, 1994

[54] PRIMER COMPOSITION

[75] Inventors: Akihiko Hiraiwa; Kenji Ito; Kaoru Kimura, all of Nagoya, Japan

[73] Assignee: Toagosei Chemica Industry Co., Ltd., Tokyo, Japan

[21] Appl. No.: 945,835

[22] Filed: Sep. 16, 1992

Related U.S. Application Data

[60] Continuation of Ser. No. 299,734, Jan. 19, 1989, abandoned, which is a division of Ser. No. 78,403, Jul. 27, 1987, Pat. No. 4,818,325, which is a division of Ser. No. 818,716, Jan. 14, 1986, abandoned.

[30] Foreign Application Priority Data

Jan. 18, 1985 [JP] Japan .................................. 60-5936
Jan. 31, 1985 [JP] Japan .................................. 60-15486

[51] Int. Cl.$^5$ .............................. C09J 5/02; C09J 5/04
[52] U.S. Cl. ........................... 106/287.1; 106/287.13; 106/287.14; 106/287.17; 106/287.2; 106/287.24; 106/287.29; 156/314
[58] Field of Search ................ 156/314; 106/287.1, 106/287.13, 287.14, 287.17, 287.29, 287.2, 287.24

[56] References Cited

U.S. PATENT DOCUMENTS

| 3,762,978 | 10/1973 | Holmes et al. | 427/322 |
| 3,779,794 | 12/1973 | De Santis | 156/329 |
| 4,525,493 | 6/1985 | Omura et al. | 106/35 |
| 4,721,750 | 1/1988 | Nakamura et al. | 525/326.5 |
| 4,731,146 | 3/1988 | Clark | 427/302 |
| 4,755,553 | 7/1988 | Kishimura et al. | 525/327.4 |
| 4,756,935 | 7/1988 | Takimoto et al. | 427/410 |
| 4,818,325 | 4/1989 | Hiraiwa et al. | 524/394 |
| 4,822,426 | 4/1989 | Ito et al. | 106/287.24 |
| 4,963,201 | 10/1990 | Bjerke et al. | 149/21 |
| 4,979,993 | 12/1990 | Okamoto et al. | 106/287.23 |
| 4,981,728 | 1/1991 | Homma et al. | 427/407.1 |
| 4,990,281 | 2/1991 | Clark | 502/155 |
| 5,110,392 | 5/1992 | Ito et al. | 156/314 |

FOREIGN PATENT DOCUMENTS 0129069 12/1984 European Pat. Off. .
3258959 10/1988 Japan ............................ 106/287.24

Primary Examiner—Mark L. Bell
Assistant Examiner—Scott L. Hertzog
Attorney, Agent, or Firm—Cooper & Dunham

[57] ABSTRACT

An adhesive system comprising, as a primer, an organometallic compound and an organic polymer, which is useful in bonding non-polar or highly crystalline resin substrates together or bonding said resin substrates and another material, such as a solid material, a coating material, paint or printing ink by using a 2-cyanoacrylate adhesive.

32 Claims, No Drawings

PRIMER COMPOSITION

This is a continuation of application Ser. No. 299,734, filed Jan. 19, 1989, now abandoned, which, in turn, is a division of Ser. No. 078,403 filed Jul. 27, 1987, Now U.S. Pat. No. 4,818,325 which, in turn is a division of Ser. No. 818,716 filed Jan. 14, 1986, abandoned.

This invention relates to a primer which is used as such in bonding non-polar or highly crystalline resin substrates together or bonding other material thereto with use of a 2-cyanoacrylate.

This invention has its object to provide a primer satisfactorily useful in bonding together easily, speedily and surely non-polar or highly crystalline resin substrates or so bonding another material to the resin substrate with use of a 2-cyanoacrylate, the resin substrates having heretofore been considered as difficult to bond together, bond the other material thereto, coat, paint and print thereon and being typified by polyethylene, polypropylene, polybutene, polyfluoroethylene, their copolymer and other polyolefin substrates as well as polyethylene terephthalate, polyacetal, nylon and soft PVC (having a high content of a plasticizer) substrates.

This invention has its another object to solve the problems that the primers earlier proposed by the present inventors are unsatisfactory in operativeness and must be severely controlled as to their film thickness to prevent their performances or properties from being degraded.

To render these substrates or materials improved in adhesiveness, there has heretofore been proposed a surface treating method which comprises subjecting the substrates, for example polyethylene or polypropylene, to flame treatment, corona discharge treatment, irradiation treatment or oxidizing treatment with a bichromate, sulfate or the like so as to produce polar groups such as a carbonyl group on the surface of the substrates. In addition, to make a resin, such as polyfluoroethylene, which is impossible to oxidize on the surface, improved in adhesiveness, there has been proposed a special chemical treatment such as lithium vapor treatment, heating treatment with an alkali in a helium stream or treatment of metallic sodium with liquid ammonia.

However, the proposed method and treatments need special equipments, are complicated to carry out, are unable to uniformly treat every part of the surface of a substrate having a complicated shape and require great expenses, these being disadvantageous.

Various primers also have been proposed. For example, Japanese Patent Appln. Laid-Open Gazettes Nos. 52-98062, 56-141328 and 57-119929 have proposed primers prepared by dissolving a chlorinated polyethylene or chlorinated polypropylene or a fatty acid-modified acrylated alkyd resin in an organic acid.

According to Japanese Pat. Appln. Laid-Open Gazette No. 58-8734, however, the primers so proposed are unsatisfactory in adhesiveness to a paint although they are satisfactory in adhesiveness to a polyolefin substrate, or, even if the paint and the polyolefin are satisfactory in adhesion to each other, the adhesiveness there between will undesirably decrease due to repetition of the cold/hot cycle.

Japanese Pat. Appln. Laid-Open Gazettes Nos. 54-124048, 54-124049 and 54-124095 have proposed a modified polyolefin prepared by incorporating solid rubber, an unsaturated carboxylic acid or the derivative thereof, and a radical generator in a polyolefin, however, according to Japanese Pat. Appln. Laid-Open Gazette No. 57-38827, the modified polyolefin will have undesirable effects on the adhesiveness of a paint formed thereon since the unreacted unsaturated carboxylic acid and the radical generator remain in the modified polyolefin.

Further, Japanese Pat. Appln. Laid-Open Gazettes Nos. 54-124050, 55-34270 and 55-84271 have proposed an improved resin composed essentially of a propylene/styrene/butadiene block copolymer and an inorganic filler, however, the improved resin so proposed seems to raise various problems as to poor weatherproofness of unpainted parts and low-temperature fragility due to the incorporation of the filler.

If non-polar or highly crystalline resins such as polyolefin can be improved in adhesiveness or they can allow a coating, painting or print to be satisfactorily formed on the surface thereof, they would be very conductive to various fields such as the automobile industry and electric appliance industry since they have many merits such as excellent properties, light weight, rust-proof and low cost as compared with metallic material.

In attempts to develop a surface treating method which is simple and speedy as compared with the conventional methods, in view of the above-mentioned situations, the present inventors made intensive studies and, as the result of their studies, they developed desired primers which enable satisfactory adhesion, coating, painting and printing.

The present inventors previously filed a U.S. patent application Ser. No. 611,691 in which is disclosed a primer comprising an organometallic compound as an effective ingredient.

The primer disclosed in said earlier U.S. application have an extremely excellent function and can attain the desired object, however, it has now been found that when used, they will raise the following problems.

The problems are that the primers so disclosed are not suitable to be stored in aluminum tubes or glass bottles because of being non-viscous particularly when in the solution form and they need techniques to be uniformly applied without sagging thereof, this indicating their inferiority in capability of application. As is apparent from the specification of said U.S. application, since said primers vary in performances such as bond strength depending on the thickness of the primer to be applied, the performances such as bond strength will not be stabilized if the thickness of the primer to be applied is specifically limited; particularly thick primer layers exhibit their brittleness, cannot be improved in bond strength and may sometimes be even disadvantageous as a primer layer because of being too thick. Such inferiority in application operation as above will raise a serious problem as to the practical use of the primers.

It has further been found that primers will often exhibit different performances as such even though they are prepared from the same materials, and they will decrease in performances during their storage or use in spite of the fact that they exhibit satisfactory performances when they have been prepared, the above being additional problems.

The present inventors made intensive studies in attempts to solve the above-mentioned problems and, as the result of their studies, accomplished this invention.

The primer of this invention comprises at least one organometallic compound and at least one organic polymer and is used in bonding non-polar or highly crystalline resin substrates together or bonding another material to the resin substrate with the use of a 2-cyanoacrylate.

The expression "bonding another material to the resin substrate with the use of a 2-cyanoacrylate" used herein is intended to mean, for example, the use of a 2-cyanoacrylate in adhesion of a solid material such as a metal, glass, a synthetic resin, rubber, leather, stone, cloth, paper, wood or ceramics to the resin substrate or the use thereof in coating or printing a resin substrate with a coating material, paint or printing ink.

The organometallic compounds in which the organic group is combined with a metal may be used in this invention irrespective of the kind, structure and the like thereof.

The organic groups contained in the organometallic compounds include alkyl, cycloalkyl, haloalkyl, alkenyl, cycloalkenyl, alkoxy, cycloalkoxy, aryl, aralkyl, aralkyloxy, acetylacetate, acyloxy and cycloalkenyloxy, aryloxy group, with $C_3$ or higher hydrocarbon groups being preferred. The metals contained in the organometallic compounds in this invention are intended to include typical metals, transition metals and metalloids and further include phosphorus, boron and silicon. The organometallic compounds are illustrated by the following structural formulae.

(1) M-O-R (wherein M is a metallic element and R an organic group; these definitions apply to the following) which shows metal alcoholates:
    organoaluminum compounds such as aluminum isopropylate, aluminum mono-sec.-butoxydiisopropylate, aluminum ethylacetoacetate diisopropylate, aluminum oleylacetoacetate diisopropylate; organotitanium compounds such as tetrabutyl titanate and tetraisopropyl titanate; organoboron compounds such as tri-n-butyl borate, triphenyl borate, tri-n-octadecyl borate and monobutyldimethyl borate; phosphoric acid esters such as trioleyl phosphate, tridecyl phosphate, dibutyl phosphite, trisisodecyl phosphite, di-2-ethylhexyl phosphite and tridecyl phosphite; tetraoctyl silicate; triisobutoxygallium; and tetrabutyl zirconate.

(2)

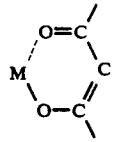

which shows 1,3-dicarbonyl complexes:
    complex salts of acetylacetonate such as aluminum trisacetylacetonate, aluminum monoacetylacetonate bisethylacetoacetate, aluminum trisethylacetoacetate; acetylacetone lithium, acetylacetone beryllium, acetylacetone sodium, acetylacetone magnesium, acetylacetone calcium, acetylacetone titanium, acetylacetone strontium, acetylacetone barium, acetylacetone thallium, acetylacetone vanadium, acetylacetone manganese (III), acetylacetone iron (III), acetylacetone thorium, acetylacetone chromium (III), acetylacetone rhodium, acetylacetone cobalt (II), acetylacetone cobalt (III), acetylacetone nickel, acetylacetone copper, acetylacetone zinc, acetylacetone zirconium, acetylacetone palladium, acetylacetone indium, acetylacetone tin (IV) and acetylacetone molybdenum; complex salt of acetoacetic acid ester, trifluoroacetylacetone and benzoylacetone.

(3)

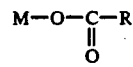

which shows carboxylates:
    magnesium stearate, aluminum stearate, calcium stearate, ferric stearate, zinc stearate, barium stearate, lead stearate, potassium stearate, copper stearate, manganese stearate, nickel stearate, nickel naphthenate, cobalt naphthenate, manganese naphthenate, magnesium naphthenate, zinc naphthenate, magnesium palmitate, cadmium palmitate, cobalt palmitate, sodium linoleate, sodium laurate, barium oleate, aluminum laurate, aluminum oleate, potassium oleate, aluminum acetate, stannous acetate, stannous 2-ethylhexanoate, aluminum formoacetate, zinc tartrate and basic aluminum thiodiglycolate.

(4) M-R which shows hydrocarbon group-containing metals:
    alkyl metals such as zinc 2-ethylhexyl, lithium hexadecyl, sodium n-hexyl, potassium hexadecyl, aluminum n-trioctyl, lead n-propylethyl, antimony tri-n-pentyl, antimony tri-n-decyl and zinc isobutylisoamyl; organotin compounds such as dibutyl tin diacetate, di-n-butyl tin dimaleate, di-n-butyl tin dioxide, triphenyl tin acetate, tri-n-butyl tin oxide, dioctyl tin dilaurate, tributyl tin acetate, tributyl tin chloride, tin tetraamyl and diallyl tin dichloride; methylvinyldichlorosilane; octadecyldimethyl[3-(trimethoxysilyl)propyl]ammonium chloride; ferrocene; titanocene dichloride; and nickelocene.

(5) M-X-R (where X is a hetero atom) shows other organometallic compounds:
    metal thioalcoholates such as n-dodecylmercaptopotassium salt and aluminum trithiobutoxide; thiodicarboxylates such as tin 2-ethylhexanemonothioate and zinc 2-ethylhexanedithioate; dithiocarbamates such as nickel dimethyldithiocarbamate, copper dimethyldithiocarbamate iron dimethyldithiocarbamate and zinc diethyldithiocarbamate; sulfonic acids such as nickel benzenesulfonate; phosphates such as vanadium dibutylphosphate; and zinc mercaptobenzothiazole.

Among these organometallic compounds, the carboxylates (3) and the hydrocarbon group-containing metals (4) are preferred, and the metal alcoholates (1) and the 1,3-dicarbonyl complex salts (2) are more preferred. More particularly, the preferred organometallic compounds include acetylacetone lithium, acetylacetone sodium, acetylacetone magnesium, acetylacetone titanium, acetylacetone iron (III), acetylacetone palladium, acetylacetone indium, tri-n-octadecyl borate, sodium linoleate, magnesium stearate, aluminum stearate, aluminum acetate, aluminum laurate, basic aluminum thiodiglycolate, calcium stearate, ferric stearate, ferrocene, copper dimethyldithiocarbamate, zinc stearate, zinc 2-ethylhexyl, zinc tartrate, stannous acetate, di-n-butyl tin raleate, di-n-butyl tin oxide, triphenyl tin acetate, barium stearate, lead stearate, dibutyl phosphite, tridecyl phosphate and trioleyl phosphate. The more preferred organometallic compounds include acetylacetone calcium, acetylacetone zinc, potassium oleate, nickel naphthenate and dioctyl tin dilaurate. The most preferred organometallic compounds include aluminum isopropylate, aluminum mono-sec.-butoxydiisopropylate, aluminum ethylacetoacetate diisopropylate, aluminum oleylacetoacetate diisopropylate, aluminum trisacetylacetonate, aluminum monoacetylacetonate bisethylacetoacetate, aluminum trisethylacetoacetate, acetylacetone manganese (III), acetylacetone cobalt (II), acetylacetone nickel, acetylacetone zinc, acetylacetone zirconium, tetrabutyl titanate, tetraisopropyl titanate, dibutyl tin diacetate, tri-n-butyl tin oxide, tin 2-ethylhexanoate, octadecyldimethyl[3(-trimethoxysilyl)-propyl]ammonium chloride and trisisodecyl phosphite.

The organic polymers used in this invention may be those generally known in the art. It is preferable, however, that they be soluble in organic solvents since the primers of this invention are used preferably in the dispersion or solution form.

The organic polymers used herein include olefinic copolymers such as ethylene/vinyl acetate copolymers, ethylene/acrylic acid ester copolymers and α-olefin/maleic acid copolymers; chlorinated olefinic polymers such as chlorinated polyethylene, chlorinated polypropylene, chlorinated ethylene/propylene copolymers and chlorinated ethylene/vinyl acetate copolymers; vinylic polymers such as polyvinyl chloride, polyvinyl acetate, poly(meth)acrylic acid ester, polyvinyl ethers and vinyl chloride/vinylidene chloride copolymers; and synthetic rubbers such as polychloroprene, NBR, SBR and chlorinated rubbers.

Of the above-mentioned various organic polymer, those which are preferred for attaining the objects of this invention are chlorinated olefinic polymers prepared by chlorination of propylene, ethylene or the like polymers or copolymers; chlorinated rubbers; olefinic copolymers such as copolymers of propylene, ethylene or the like; and methyl methacrylate/chloroprene copolymers with chlorinated polypropylene and methyl methacrylate/chloroprene copolymers being particularly preferred.

The primer of this invention is used for coating on a non-polar or highly crystalline resin substrates in bonding the resin substrates together or bonding another material thereto with use of a 2-cyanoacrylate. In this case, it is desired to control the thickness of the organometallic compounds coated so that the full effects of this invention are attained as described later. For this purpose, it is preferred that the compounds be used in solution.

The solvents used herein are preferably a usual one which is capable of completely dissolving or dispersing the organometallic compound and organic polymer therein, has suitable volatility and is industrially easily available. The solvents are also preferably such that a resin, such as polyolefin, can be fully wetted on the surface therewith, in order to allow the primers to exercise their performance more efficiently. For this purpose, it is further preferable to selectively use an organic solvent which has a surface tension lower than the critical surface tension (γc) of the resin. The following Table 1 indicates the surface tension and the critical surface tension of typical solvents to help one skilled in the art in selecting a solvent to be used.

TABLE 1

| Critical surface tension (γc) of resin (dyne/cm. 20° C.) | | Surface tension of organic solvent (dyne/cm. 20° C.) | |
|---|---|---|---|
| Polytrifluoroethylene | 22 | 1,1,2-trichloro-1,2,2-trifluoroethane | 19 |
| Polyethylene | 31 | Ethanol | 22 |
| Polypropylene | 31 | Acetone | 23 |
| Polyacetal | 40 | Ethyl acetate | 24 |
| Polyvinylidene chloride | 40 | 1,1,1-trichloroethane | 26 |
| Polyethylene terephthalate | 43 | Tetrahydrofuran | 26 |
| 6-6 nylon | 46 | 1,4-dioxane | 27 |
| | | Toluene | 28 |

It is preferable that the organometallic compound in solution be in a concentration by weight of 0.001–10% for the reason that the organometallic compound may be coated to nearly thickness of monomolecular layer thereof whereby the compound can exhibit its best performance as described later.

The concentration of organic polymer used will vary depending on the kind of the polymer and is preferably in the range of 0.1–20% by weight. If the concentration used is less than 0.1% by weight then it will be difficult to attain the objects of this invention, whereas the use of a concentration of more than 20% by weight will hinder the action of the organometallic compound, which plays a principal part as a primer, whereupon the primer decreases in performance as such. Further, it is preferred that the amount of kind of the organic polymers contained in a primer be determined so that when the primer is made to be a primer solution, the primer solution will have a viscosity in the range of 2–5000 cp at 25° C. It will be difficult to attain the objects of this invention when the viscosity of primer solution used is outside of said range. In addition, when the primer is used in the solution form, it is possible to add to the primer solution a small amount of a viscosity improver such as fused silica in order to use the solution as a thixotropic one.

It has been found by the present inventors that the variation of the primer of this invention in quality and properties as well as the degradation thereof in quality during its use or storage, is caused by the presence of water in the primer and that it is desirable to limit the water content of the primer to a certain amount, that is, 500 ppm or less in order to solve one of the above-mentioned problems.

To limit the water content of the primer to within 500 ppm, it is desired to limit not only the water contents of the organometallic compound and organic polymer as the ingredients of the primer but also the water content of an organic solvent used together with said ingredients if necessary.

It is also desired to prepare a primer from the above ingredients in a dehumidified chamber or using a moisture-preventing apparatus.

The primer will absorb moisture from air during its use or storage even if it is free of water just after it has been prepared. The primer will further absorb moisture for a long period of time to an extent that the water content of the primer exceeds 500 ppm, whereby the primer lowers in primer performance. Thus, it is desirable that the primer be treated so that its water content does not exceed 500 ppm even a long time after its preparation.

To prevent the primer from absorbing moisture during the storage thereof, the primer may be stored in glass- or metal-made containers as well as in nonpermeable material-made containers such as plastics-made containers having a polyvinilidene chloride layer. However, it is unavoidable that the primer will absorb moisture during its use, and it is undesirable that the containers for the primer are limited to specific ones. Therefore, it is preferable to prevent the water content in the primer from exceeding 500 ppm by moisture absorption.

To this end, a desiccating agent or an adsorbent may be housed in a space within a container or under the lid thereof, the space being so defined as to prevent contact of the primer with the desiccating agent or adsorbent. A simple method for limiting the water content in the primer, comprises allowing a solid desiccating agent or adsorbent to coexist with the primer thereby rendering it possible to remove the water absorbed or the water derived from the ingredients of which the primer is composed and keep the water content in the primer at a level of not more than 500 ppm.

The desiccating agents used herein include various kinds of desiccating agents such as phosphorus pentoxide, activated alumina, anhydrous calcium sulfate, magnesium oxide, calcium oxide, calcium chloride, magnesium sulfate, diatomaceous earth, anhydrous zinc chloride, anhydrous copper (III) sulfate, silica gel and silica alumina. The adsorbents used herein include molecular sieve and activated carbon. The desiccating agents or adsorbents which are allowed to exist in the primer, are preferably those which meet the following requirements:
(1) They are solid materials,
(2) They are neutral or nearly neutral,
(3) They do not react with the primer,
(4) They are not dissolved in the primer, and
(5) They do not hinder the primer performance or activity of the primer.

Thus, they include activated alumina, magnesium oxide, magnesium sulfate, diatomaceous earth, silica alumina with silica gel and molecular sieves being more preferable.

The desiccating agents and adsorbents to be added to the primer are preferably particulate in shape and the particle size thereof is preferably in the range of about 0.5–10 mm. If they have a particle size of smaller than 0.5 mm then they will run out of the primer and be attached to the surface to be coated during the use of the primer, whereas if they have too large a particle size then they will come to be large in volume and unsuitable in shape as merchandise. The amount of such desiccating agents or adsorbents used may be determined taking into consideration the expected amount of moisture to be absorbed and the capability of the agents or adsorbents to absorb moisture.

The 2-cyanoacrylate used in this invention is represented by the following general formula

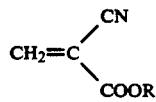

wherein R is alkyl, alkenyl, cycloalkyl, aryl, alkoxyalkyl, aralkyl, haloalkyl or the like and more particularly it is illustrated by methyl, ethyl, n-propyl, n-butyl, isobutyl, n-pentyl, allyl, cyclohexyl, benzyl or methoxypropyl.

The 2-cyanoacrylates used herein are the main component of commercially available cyanoacrylate-based instant adhesives which may be used as they are as the 2-cyanoacrylate in this invention.

The commercially available cyanoacrylate-based adhesives are composed mainly of a 2-cyanoacrylate and may be further incorporated with various ingredients as illustrated below:
(1) Stabilizer
(2) Thickener
(3) Modifier
(4) Dyestuff The stabilizer is for enhancing the storage stability of the cyanoacrylate-based adhesives and is illustrated by sulfur dioxide, an aromatic sulfonic acid or a sultone as an anion polymerization inhibitor and by hydroquinone or hydroquinone monomethyl ether as a radical polymerization inhibitor.

The thickener used herein is for increasing the viscosity of the cyanoacrylate-based adhesives to several ten to several thousand cp since usually a 2-cyanoacrylate is a low viscous liquid having a viscosity of about several cp. The thickener used herein includes a polymethylmethacrylate, acryl rubber or cellulose derivative.

The modifier used herein is for improving the impact resistance or heat resistance which are drawbacks of conventional cyanoacrylate-based adhesives and is illustrated by maleic anhydride or a derivative thereof as an improver of heat resistance as indicated in Japanese Pat. Appln. Gazette No. 52-12737. To enable a porous and acidic sap-containing woody material which has heretofore been considered difficult to bond, to be bonded, crown compounds and the like may be used as indicated in, for example, Japanese Pat. Appln. Publication Gazette No. 55-2238.

Further, to provide a flexible adhesive layer, the original adhesive may be incorporated with a plasticizer such as tricresyl phosphate, dioctyl phthalate or dimethyl sebacate.

The dyestuff used herein is for, for example, rendering a bonded portion easily identifiable, the original adhesive may be incorporated with, for instance, an acidic salt of basic dye as indicated in Japanese Pat. Appln. Laid-Open Gazette No. 53-37260 or the like.

Furthermore, the original adhesive may further be incorporated with a perfume such as an ester derivative as indicated in Pat. Appln. Laid-Open Gazette No. 53-58541 or the like, in order to provide the adhesive with fragrance.

In the practice of this invention, the 2-cyanoacrylate may be used in the form of a diluted solution in a specific organic solvent. The organic solvent should be such that it is compatible with the 2-cyanoacrylate and does not impair the stability thereof, and it includes toluene, butyl acetate or methylchloroform. It is preferred that the organic solvent contains none of moisture and other impurities.

In a case where two substrates to be bonded together are each a non-polar or highly crystalline resin, coating of the organometallic compound may be effected by immersing the both of the substrate in a solution of the primer for several seconds or coating it with the solution of the use of a brush or spray gun and then air drying, while in a case where one of substrates to be bonded together is a non-polar or highly crystalline resin, the substrate may be treated only in the same manner as above.

The primer coated non-polar or highly crystalline resin substrates together or another material and the substrate are bonded using the 2-cyanoacrylate by a usual means, thus obtaining a bonded body having very excellent bond strength.

In the coating method of the primer, there may also be used a method which comprises ejecting a 2-cyanoacrylate and a solution of the organometallic compound simultaneously by the use of spray gun having two nozzles.

In a process for forming a coating, painting or printing on a non-polar or highly crystalline resin substrate, the primer is coated on the resin substrate by the above-mentioned coating method, and then a 2-cyanoacrylate is coated and polymerized to form a polymer film thereof, thus producing a resin substrate having satisfactory receptivity and bond strength to coating materials, paints and printing ink. The thus produced resin substrates may be coated or printed by a conventional means to form an excellent coating, painting and printing thereon.

In the coating steps the following steps will show more excellent effects in coatings.

In a first step, a primer prepared by dissolving the organometallic compound and organic polymer in an organic solvent, is coated on a substrate on which a coating, painting or printing is to be formed by an immersing or spraying method and being laid usually 5-60 minutes at room temperature or several days depending on the operational steps taken.

In a second step, the 2-cyanoacrylate is coated on the primer-coated substrate to form a poly-2-cyanoacrylate film, by a coating method using a preliminarily acid-treated brush, an immersing method, a spraying method, or the like. In a case where the spraying method is used, it is preferred to use a diluted solution of a 2-cyanoacrylate in an organic solvent in order to prevent the nozzles of spray gun from being clogged.

In addition, in a case where a commercially available cyanoacrylate-based adhesive is used, it is preferable to choose the low viscosity one.

The substrate on which the 2-cyanoacrylate has been coated is allowed to stand at room temperature for at least 12 hours to form a poly-2-cyanoacrylate film.

The poly-2-cyanoacrylate film is not particularly limited in thickness, but it is preferable that the thickness be in the range of $0.1$–$100\mu$, preferably $10$–$50\mu$ to eliminate defective coated portions.

The substrate on which the primer and a 2-cyanoacrylate have been coated as indicated above, is then coated with a usual coating material, painted with a paint or printed with a usual printing ink.

There are various kinds of coating materials, paints or printing inks which may be classified in various ways, however, they may be enumerated from the view-point of the kind of vehicle resin used, as follows:

rosin derivatives, nitrocellulose resins, vinylic resins, acrylic resins, polyester resins, polyamide resins, polyurethane resins, phenolic resins, epoxy resins, aminoalkyd resins, melamine resins and UV-curable acryl oligomers.

From the view-point of use, particularly preferred coating materials, paints or printing inks for use in applying to a polyolefin substrate are those containing a polyurethane resin, an epoxy resin, or an alkyd resin.

As to thermosetting coating materials, those which may be cured at a baking temperature of not higher than 90° C. are preferred.

A coating material or a paint may be applied by a usual method such as a coating method using a brush, a bar coater, a roller coater or a spray gun, while a printing ink may be applied by a usual method such as a silk screen printing method, a gravure printing method or a flexographic printing method.

It is not clear why the adhesiveness of a non-polar or highly crystalline resin to another material is improved by using the organometallic compound of this invention as the primer and the 2-cyanoacrylate, however, the organometallic compounds will exhibit their best primer performance when they are very thinly coated to an extent that the amount thereof coated reaches 0.001 to 1 $g/m^2$ although the optimum thickness varies depending on the kind of the organometallic compound used.

Bonding tests were made by using a polypropylene plate (2 mm thick) as the resin substrate, acetylacetone zirconium (used as solutions of various concentrations in methylchloroform) as the primer, and a 2-cyanoacrylate-based adhesive (produced under the tradename of Aron Alpha No. 201 by Toagosei Chemical Industrial Co., Ltd.), to obtain bonded products which were measured for tensile shear strength at the bonded portion. The following Table A indicates the differences in tensile shear strength due to the differences in amount of the primer coated. The bonded products were aged at 23° C. under a relative humidity (RH) of 60% for one day.

TABLE A

| Conc. of primer (wt. %) | Amount of primer coated ($g/m^2$) | Tensile shear strength ($kgf/cm^2$) |
|---|---|---|
| 5 | 0.5–2.5 | 3 |
| 3 | 0.3–1.5 | 10 |
| 1 | 0.1–0.5 | 15 |
| 0.5 | 0.05–0.25 | 36 |
| 0.25 | 0.025–0.125 | 55* |
| 0.05 | 0.005–0.025 | 60* |
| 0.025 | 0.0025–0.0125 | 27 |
| 0.01 | 0.001–0.005 | 11 |
| 0.001 | 0.0001–0.0005 | 3 |

Note: The symbol, *, indicates the destruction of plate.

It is seen from the results in Table A that the primer will exhibit its best performance when it is coated in nearly the thickness of its monomolecular layer. From the above results and the fact that the organometallic compounds have a polar segment and non-polar segment in structure, it is surmised that the effects of this invention are produced under the following mechanism.

The organometallic compound, that is, the primer of this invention is present in approximately the monomolecular layer between the surface of the non-polar or highly crystalline resin substrate and the 2-cyanoacrylate layer (monomer or polymer film layer) whereby the groups highly compatible with the 2-cyanoacrylate layer, in other words, the lipophilic groups and the polar groups are arranged in order and these groups act as a bonding agent to obtain the effects of this invention.

To obtain the best results in accordance with this invention, it is necessary to determine an organometallic compound and organic polymer to be used, the concentration of the compound, the amount thereof applied, and the like in view of the nature of the organometallic compound, the organic polymer, a substrate and a material to be bonded thereto. As to the amount of the organometallic compound (primer) applied, the use of the primer in such a small amount that the resulting primer layer does not cover all the surface of the substrate which is needed, will naturally not give good results, whereas the use thereof in such a large amount that the resulting primer layer is thicker than the monomolecular layer, will result in forming a fragile primer layer whereby the results of this invention are not obtained. Thus, the concentration of an organometallic compound in solution (primer solution) is preferably 0.001–10% by weight and the amount of the primer coated is in the range of preferably 0.001–1 g/m², more preferably 0.01–0.1 g/m².

A secure bond is effected between a non-polar or highly crystalline resin substrate and a 2-cyano-acrylate with aid of the organometallic compound present therebetween whereby the resin substrate is much improved in adhesiveness and, further, a usual coating material or printing ink can easily be applied to the treated resin substrate without causing any problems owing to the presence of a poly-2-cyanoacrylate film formed thereon.

The excellent effects obtained by the practice of this invention are those which may be attained by the combined use of the 2-cyanoacrylate, organometallic compound and non-polar or highly crystalline resin substrate. On the other hand, in cases where a bond is attempted to be effected between polyolefin (such as polyethylene) and something, an organotitanium compound was once studied to find whether it is useful as a primer or preliminary treatment; in these cases, however, excellent effects were not appreciated since an epoxy, urethane, rubber or acrylic adhesive was used. These conventional means do not anticipate at all the present invention which will unexpectedly excellent effects when practiced.

The effects of this invention will be exhibited only when a non-polar or highly crystalline resin is used as the substrate, whereas they will not be exhibited when other materials (such as a metal, wood or porcelain) are used as the substrate.

The primer of this invention is effective for a non-polar or highly crystalline resin such as olefinic polymers typified by polyethylene, polypropylene, polybutene and polymethylpentene; composite materials composed of the olefinic polymers incorporated with talc, alumina, mica, glass fibers and the like; polyethylene terephthalate; polyacetal; polyurethane; silicone rubbers; and soft-type PVC (polyvinyl chloride). It is for olefinic polymers such as polyethylene and polypropylene that the primer of this invention is the most effective.

This invention will be better understood by the following Examples and Comparative Examples wherein all parts and percentages are by weight unless otherwise specified.

EXAMPLE 1

0.5 parts of Manganese (III) acetylacetonate and 2 parts of chlorinated polypropylene (produced under the tradename of SUPERCHLON 106H by Sanyo Kokusaku Pulp Co., Ltd.) were dissolved in 97.5 parts of toluene to obtain a primer. In accordance with JIS K6861-1977, the thus obtained primer was applied to polypropylene resin-made test pieces (25×100×2 mm thick), air dried, bonded using 2-ethylcyanoacrylate under a pressure of 0.1 kgf/cm², aged for one day and then measured for tensile shear bond strength (TSS) at a pull rate of 20 mm/sec. by a STROGRAPH W-type tester (produced by Toyo Seiki Co., Ltd.) in accordance with JIS K6861-1977. The set time was also measured at the same time in this and the following Examples and Comparative Examples. The results are as shown in Table 2.

EXAMPLES 2–7

The same tests as in Example 1 were made using the organometallic compounds, organic polymers and solvents indicated in Table 2. The results are as shown in Table 2.

EXAMPLE 8

A primer consisting of 0.5% of tetrabutyl titanate and 3% of a methyl methacrylate/chloroprene copolymer (compositional ratio 25/75, molecular weight about 200,000) in toluene, had a viscosity of about 100 cp and was satisfactory in coating operation. The primer was filled in an aluminum tube, whose top of end was closed with a cap, through the bottom open end thereof, after which the bottom portion was folded in four and closed by rolls to close the bottom open end, left in a room for 6 months and then measured for weight loss and primer performance with the result that no weight loss and no performance degradation were found as in Example 1.

COMPARATIVE EXAMPLE 1

Polypropylene resin-made test pieces were bonded together using 2-ethylcyanoacrylate without the use of the primer and then measured for tensile shear bond strength. The results are as shown in Table 2.

COMPARATIVE EXAMPLE 2

The procedure of Example 1 was followed except using as the primer a solution of 2 parts of chlorinated polypropylene (SUPERCHLON 106H) in 98 parts of toluene. The results are as shown in Table 2.

COMPARATIVE EXAMPLE 3

The procedure of Example 1 was followed except using as the primer a solution of 3 parts of tetrabutyl titanate in 97 parts of toluene. The results are as shown in Table 2.

COMPARATIVE EXAMPLE 4

An 0.5% solution of tetrabutyl titanate in toluene had a viscosity of about 1 cp and was unsatisfactory in coating operation as a primer. The solution was subjected to the same storage test as in Example 8 with the result that the solution in a tube evaporated remarkably and came to be useless as a primer six months after the start of storage.

TABLE 2

| | Organometallic compound (wt %) | Organic polymer (wt %) | Solvent | TSS (kgf/cm²) | Set time (sec.) |
| --- | --- | --- | --- | --- | --- |
| Example 1 | Manganese (III) acetylacetonate (0.5) | Chlorinated polypropylene (2.0) *1 | Toluene | Rupture | 30 |
| Example 2 | Tetrabutyl titanate (0.5) | Chlorinated polypropylene (2.0) *1 | Toluene | " | 15 |
| Example 3 | Aluminum isopropylate (1.0) | Chlorinated polypropylene (2.0) *1 | Toluene | " | 30 |

TABLE 2-continued

| | Organometallic compound (wt %) | Organic polymer (wt %) | Solvent | TSS (kgf/cm$^2$) | Set time (sec.) |
|---|---|---|---|---|---|
| Example 4 | Tetrabutyl titanate (0.5) | Chloroprene rubber (3.0) *2 | 1,1,1-trichloroethane | " | 30 |
| Example 5 | Tetrabutyl titanate (3.0) | Chloroprene rubber (2.0) *2 | Toluene | " | 15 |
| Example 6 | Tetrabutyl titanate (0.5) | Chlorinated polyethylene (2.0) *3 | 1,1,1-trichloroethane | " | 15 |
| Example 7 | Tetrabutyl titanate (0.5) | Methyl methacrylate/-chloroprene copolymer (2.0) *4 | Toluene | " | 60 |
| Comp. Example 1 | — | — | — | 4 | At least 180 |
| Comp. Example 2 | — | Chlorinated polypropylene (2.0) *1 | Toluene | 21 | 120 |
| Comp. Example 3 | Tetrabutyl titanate (3.0) | — | Toluene | 17 | 15 |

*1 Chlorinated polypropylene Produced under the tradename of SUPERCHLON 106H by Sanyo Kokusaku Pulp Co., Ltd.
*2 Chloroprene rubber Reagent produced by Aldorich Co.: Mooney Viscosity 100 (at 100° C.).
*3 Chlorinated polyethylene Produced under the tradename of SUPERCHLON 1107LL by Sanyo Kokusaku Pulp Co., Ltd.
*4 Compositional ratio 25/75 Mol. wt. about 200,000
Rupture: Rupture of test pieces

REFERENCE EXAMPLE 1 AND COMPARATIVE REFERENCE EXAMPLE 1

The following three kinds of solutions were prepared as primers.
A: A 1% solution of mono-sec.-butoxyaluminum diisopropylate in toluene.
B: A 1% solution of ethylacetoacetate aluminum diisopropylate in ethyl acetate.
C: A 1% solution of aluminum tris(ethylacetoacetate) in methylchloroform.

Each of the primers A, B and C was placed in a 100-c.c. polyethylene-made bottle, incorporated with, as the solid desiccating agent, particulate silica gel having a particle size of about 5 mm (produced by Hayashi Junyaku Chemicals Co., Ltd.) in an amount of 5% of the primer, stored at 25° C. under a RH (relative humidity) of 90-100% and then measured for moisture content with time by Karl-Fisher titration method using AQUACOUNTER AQ-1 (produced by Hiranuma Works) simultaneously with being subjected to performance test.

For comparison, the procedure of Reference Example 1 was followed except the silica gel was not added.
The results are as indicated in Table 3.

REFERENCE EXAMPLE 2 AND COMPARATIVE REFERENCE EXAMPLE 2

The following three kinds of solutions were prepared as primers.
D: An 0.5% solution of butyltin diacetate in xylene.
E: An 0.5% solution of tetrisopropyl titanate in butyl acetate.
F: An 0.5% solution of acetylacetone zirconium in trichloroethlene.

Each of the primers D, E and F was placed in a 100-c.c. polyethylene-made bottle, incorporated with, as the adsorbent, molecular sieve 3A having a particle size of 3.2 mm (produced by Kishida Chemical Co., Ltd.) in an amount of 3% of the primer, stored at 25° C. under a RH of 90-100% and tested with time for moisture content and primer performance in the same manner as in Reference Example 1.

For comparison, the procedure of Reference Example 1 was followed except that the molecular sieve was not used. The results are as shown in Table 4.

EXAMPLES 9-11

Using organometallic compounds, organic polymers, solvents and desiccating agents in mixing ratios as indicated in Tables 5-7, primers were prepared. The thus prepared primers were evaluated for their primer performance with the result that each of them exhibited excellent performance as indicated in Tables 5-7.

TABLE 3

Effect of Moisture on Primer Performance

| | Primer | Desiccating agent | At the start of storage | | 3 months after the start of storage | | 6 months after the start of storage | |
|---|---|---|---|---|---|---|---|---|
| | | | Moisture content (ppm) | TSS (kgf/cm$^2$) | Moisture content (ppm) | TSS (kgf/cm$^2$) | Moisture content (ppm) | TSS (kgf/cm$^2$) |
| Ref. Ex. 1 | A | Used | 162 | Rupture | 173 | Rupture | 175 | Rupture |
| | B | Used | 154 | Rupture | 168 | Rupture | 169 | Rupture |
| | C | Used | 139 | Rupture | 144 | Rupture | 147 | Rupture |
| Comp. Ref. Ex. 1 | A | Nonused | 193 | Rupture | 651 | 12 | 987 | 6 |
| | B | Nonused | 177 | Rupture | 682 | 13 | 896 | 7 |
| | C | Nonused | 151 | Rupture | 603 | 15 | 995 | 5 |

Rupture: Rupture of test pieces

TABLE 4

Effect of Moisture on Primer Performance

| | Primer | Adsorbent | At the start of storage | | 3 months later | | 6 months later | |
|---|---|---|---|---|---|---|---|---|
| | | | Moisture (ppm) | TSS (kgf/cm$^2$) | Moisture (ppm) | TSS (kgf/cm$^2$) | Moisture (ppm) | TSS (kgf/cm$^2$) |
| Ref. Ex. 2 | D | Used | 148 | Rupture | 152 | Rupture | 163 | Rupture |
| | E | Used | 156 | " | 161 | " | 166 | " |
| | F | Used | 163 | " | 164 | " | 170 | " |
| Comp. Ref. Ex. 2 | D | Nonused | 175 | " | 662 | 9 | 973 | 6 |
| | E | Nonused | 182 | " | 789 | 6 | 1,082 | 4 |
| | F | Nonused | 169 | " | 701 | 7 | 984 | 5 |

Rupture: Rupture of test pieces

TABLE 5

(Example 9)

| Composition of Primer | | | | | | Desiccating agent Molecular sieve 3A | At the start of storage | | 30 days later | |
|---|---|---|---|---|---|---|---|---|---|---|
| Organometallic compound | wt % | Organic polymer | wt % | Solvent | wt % | gr/polymer 100 g | Moisture (ppm) | TSS (kgf/cm$^2$) | Moisture (ppm) | TSS (kgf/cm$^2$) |
| Aluminum isopropylate | 0.3 | Chlorinated polyethylene | 2.0 | Toluene | 97.7 | 3 | 151 | Rupture | 148 | Rupture |
| | | Chlorinated polypropylene | 2.0 | Toluene | 97.7 | 3 | 143 | Rupture | 144 | Rupture |
| Tetrabutyl titanate | 0.3 | Chloroprene rubber | 2.0 | Toluene | 97.7 | 3 | 154 | Rupture | 175 | Rupture |
| | | Methyl methacrylate/-chloroprene copolymer | 2.0 | Toluene | 97.7 | 3 | 148 | Rupture | 151 | Rupture |

| Composition of Primer | | | | | | 60 days later | |
|---|---|---|---|---|---|---|---|
| Organometallic compound | wt % | Organic polymer | wt % | Solvent | wt % | Moisture (ppm) | TSS (kgf/cm$^2$) |
| Aluminum isopropylate | 0.3 | Chlorinated polyethylene | 2.0 | Toluene | 97.7 | 167 | Rupture |
| | | Chlorinated polypropylene | 2.0 | Toluene | 97.7 | 159 | Rupture |
| Tetrabutyl titanate | 0.3 | Chloroprene rubber | 2.0 | Toluene | 97.7 | 157 | Rupture |
| | | Methyl methacrylate/-chloroprene copolymer | 2.0 | Toluene | 97.7 | 155 | Rupture |

Rupture: Rupture of test pieces

TABLE 6

(Example 10)

| Composition of Primer | | | | | | Desiccating agent Silica gel Blue | At the start of storage | | 30 days later | |
|---|---|---|---|---|---|---|---|---|---|---|
| Organometallic compound | wt % | Organic polymer | wt % | Solvent | wt % | gr/polymer 100 g | Moisture (ppm) | TSS (kgf/cm$^2$) | Moisture (ppm) | TSS (kgf/cm$^2$) |
| Mono-sec.-butoxy-aluminum diisopropylate | 0.3 | Chlorinated polyethylene | 2.0 | Methyl-chloroform | 97.7 | 5 | 147 | Rupture | 155 | Rupture |
| | | Chlorinated polypropylene | 2.0 | Methyl-chloroform | 97.7 | 5 | 144 | Rupture | 149 | Rupture |
| Trisisodecyl phosphite | 0.3 | Chloroprene rubber | 2.0 | Methyl-chloroform | 97.7 | 5 | 159 | Rupture | 164 | Rupture |
| | | Methyl methacrylate/-chloroprene copolymer | 2.0 | Methyl-chloroform | 97.7 | 5 | 153 | Rupture | 162 | Rupture |

| Composition of Primer | | | | | | 60 days later | |
|---|---|---|---|---|---|---|---|
| Organometallic compound | wt % | Organic polymer | wt % | Solvent | wt % | Moisture (ppm) | TSS (kgf/cm$^2$) |
| Mono-sec.- | 0.3 | Chlorinated | 2.0 | Meth- | 97.7 | 147 | Rupture |

TABLE 6-continued (Example 10)

| | | | | | | | | |
|---|---|---|---|---|---|---|---|---|
| | butoxy-aluminum diisopropylate | | polyethylene | | yl-chloroform | | | |
| | | | Chlorinated polypropylene | 2.0 | Methyl-chloroform | 97.7 | 150 | Rupture |
| | Trisisodecyl phosphite | 0.3 | Chloroprene rubber | 2.0 | Methyl-chloroform | 97.7 | 160 | Rupture |
| | | | Methyl methacrylate/-chloroprene copolymer | 2.0 | Methyl-chloroform | 97.7 | 161 | Rupture |

Rupture: Rupture of test pieces

TABLE 7

(Example 11)

| Composition of Primer | | | | | Desiccating agent Molecular sieve 3A | At the start of storage | | 30 days later | |
|---|---|---|---|---|---|---|---|---|---|
| Organometallic compound | wt % | Organic polymer | wt % | Solvent | wt % | gr/polymer 100 g | Moisture (ppm) | TSS (kgf/cm$^2$) | Moisture (ppm) | TSS (kgf/cm$^2$) |
| Ethyl acetoacetate | 0.3 | Chlorinated polyethylene | 2.0 | Ethyl acetate | 97.7 | 3 | 155 | Rupture | 168 | Rupture |
| Al-diisopropylate | | Chlorinated polypropylene | 2.0 | Ethyl acetate | 97.7 | 3 | 150 | Rupture | 164 | Rupture |
| Acetylacetone zirconium | 0.3 | Chloroprene rubber | 2.0 | Ethyl acetate | 97.7 | 3 | 149 | Rupture | 154 | Rupture |
| | | Methyl methacrylate/-chloroprene copolymer | 2.0 | Ethyl acetate | 97.7 | 3 | 157 | Rupture | 162 | Rupture |

| Composition of Primer | | | | | | 60 days later | |
|---|---|---|---|---|---|---|---|
| Organometallic compound | wt % | Organic polymer | wt % | Solvent | wt % | Moisture (ppm) | TSS (kgf/cm$^2$) |
| Ethyl acetoacetate | 0.3 | Chlorinated polyethylene | 2.0 | Ethyl acetate | 97.7 | 160 | Rupture |
| Al-diisopropylate | | Chlorinated polypropylene | 2.0 | Ethyl acetate | 97.7 | 161 | Rupture |
| Acetylacetone zirconium | 0.3 | Chloroprene rubber | 2.0 | Ethyl acetate | 97.7 | 149 | Rupture |
| | | Methyl methacrylate/-chloroprene copolymer | 2.0 | Ethyl acetate | 97.7 | 158 | Rupture |

Rupture: Rupture of test pieces

What is claimed is:

1. In an adhesive system comprising a 2-cyanoacrylate based adhesive and a primer therefor containing an organometallic compound and an organic solvent, the improvement wherein said primer has a moisture content of not more than 500 ppm.

2. An adhesive system according to claim 1 wherein the moisture content is not more than 200 ppm.

3. An adhesive system according to claim 1 wherein said organometallic compound is a metal alcoholate represented by the formula,

M—O—R wherein M is an elemental metal and R is an organic group.

4. An adhesive system according to claim 1 wherein said organometallic compound is a 1,3-dicarbonyl complex compound represented by the formula,

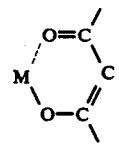

wherein M is a metallic element.

5. An adhesive system according to claim 1 wherein said organometallic compound is a carboxylate represented by the formula,

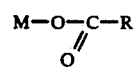

wherein M is a metallic element and R is an organic group.

6. An adhesive system according to claim 1 wherein said organometallic compound is an organic group-containing metal compound represented by the formula,

M—R wherein M is a metallic element and R is said organic group.

7. An adhesive system according to claim 1 wherein said organometallic compound is represented by the formula,

M—X—R wherein M is a metallic element, X is a hetero atom and R is an organic group.

8. An adhesive system according to claim 3 wherein said organic group is a straight- or branched-chain alkyl, a cycloalkyl, a straight- or branched-chain haloalkyl, a straight- or branched-chain alkenyl, cycloalkenyl, a straight- or branched-chain alkoxy. cycloalkoxy, aryl, aralkyl, aralkyloxy, acetylacetate, acyloxy, cycloalkenyloxy or aryloxy group.

9. An adhesive system according to claim 5 wherein said organic group is a straight- or branched-chain alkyl, cycloalkyl, a straight or branched-chain haloalkyl, a straight- or branched-chain alkenyl, cycloalkenyl, a straight- or branched-chain alkoxy, cycloalkoxy, aryl, aralkyl, aralkyloxy, acetylacetate, acyloxy, cycloalkoxy or aryloxy group.

10. An adhesive system according to claim 6 wherein said organic group is a straight- or branched-chain alkyl, cycloalkyl, a straight or branched-chain haloalkyl, a straight- or branched-chain alkenyl, cycloalkenyl, a straight- or branched-chain alkoxy, cycloalkoxy, aryl, aralkyl, aralkyloxy, acetylacetate, acyloxy, cycloalkenyloxy or aryloxy group.

11. An adhesive system according to claim 7 wherein said organic group is a straight- or branched-chain alkyl, cycloalkyl, a straight- or branched-chain haloalkyl, a straight- or branched-chain alkenyl, cycloalkenyl, a straight- or branched-chain alkoxy, cycloalkoxy, aryl, aralkyl, aralkyloxy, acetylacetate, acyloxy, cycloalkenyl or aryloxy group.

12. An adhesive system according to claim 3 wherein said organic group is a hydrocarbon group having at least three carbon atoms.

13. An adhesive system according to claim 5 wherein said organic group is a hydrocarbon group having at least three carbon atoms.

14. An adhesive system according to claim 6 wherein said organic group is a hydrocarbon group having at least three carbon atoms.

15. An adhesive system according to claim 7 wherein said organic group is a hydrocarbon group having at least three carbon atoms.

16. An adhesive system according to claim 3 wherein elemental metal is a metallic element, phosphorus, boron or silicon.

17. An adhesive system according to claim 3 wherein said elemental metal is a metallic element phosphorus, boron or silicon.

18. An adhesive system according to claim 5 wherein said metallic element is an elemental metal, phosphorus, boron or silicon.

19. An adhesive system according to claim 6 wherein said metallic element is an elemental metal, phosphorus, boron or silicon.

20. An adhesive system according to claim 7 wherein said metallic element is an elemental metal, phosphorus, boron or silicon.

21. An adhesive system according to claim 3 wherein said organometallic compound of the formula M—O—R is aluminum isopropylate, aluminum monosec.-butoxydiisopropylate, aluminum ethylacetoacetate diisopropylate, aluminum oleylacetoacetate diisopropylate, tetrabutyl titanate, tetraisopropyl titanate, tri-n-butyl borate, triphenyl borate, tri-n-octadecyl borate and monobutyldimethyl borate, trioleyl phosphate, tridecyl phosphate, dibutyl phosphite, trisisodecyl phosphate, di-2-ethylhexyl phosphite, tridecyl phosphite, tetraoctyl silicate, triisobutoxygallium or tetrabutyl zirconate.

22. An adhesive system according to claim 4 wherein said organometallic compound of the formula

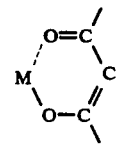

is aluminum trisacetylacetonate, aluminum monoacetylacetonate bisethylacetoacetate, aluminum trisethylacetoacetate, acetylacetone lithium, acetylacetone beryllium, acetylacetone sodium, acetylacetone magnesium, acetylacetone calcium, acetylacetone titanium, acetylacetone strontium, acetylacetone barium, acetylacetone thallium, acetylacetone vanadium, acetylacetone manganese (III), acetylacetone iron (III) acetylacetone thorium, acetylacetone chromium (III), acetylacetone rhodium, acetylacetone cobalt (II), acetylacetone cobalt (III), acetylacetone nickel, acetylacetone copper, acetylacetone zinc, acetylacetone zirconium, acetylacetone palladium, acetylacetone indium, acetylacetone tin (IV), acetylacetone molybdenum complex salt, acetoacetic acid ester, trifluoroacetylacetone or benzoylacetone complex salt.

23. An adhesive system according to claim 5 wherein said organo-metallic compound of the formula

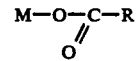

is magnesium stearate, aluminum stearate, calcium stearate, ferric stearate, zinc stearate, barium stearate, lead stearate, potassium stearate, copper stearate, manganese stearate, nickel stearate, nickel naphthenate, cobalt naphthenate, manganese naphthenate, magnesium naphthenate, zinc naphthenate, magnesium palmitate, cadmium palmitate, cobalt palmitate, sodium linoleate, sodium laurate, barium oleate, aluminum laurate, aluminum oleate, sodium laurate, barium oleate, aluminum laurate, aluminum oleate, potassium oleate, aluminum acetate, stannous acetate, stannous 2-ethylhexanolate, aluminum formoacetate, zinc tartrate or basic aluminum thiodiglycolate.

24. An adhesive system according to claim 6, wherein said organo-metallic compound of the formula M-R is zinc 2-ethylhexyl, lithium hexadecyl, sodium n-hexyl, potassium hexadecyl, aluminum n-trioctyl, lead n-propylethyl, antimony tri-n-pentyl, antimony tri-n-decyl and zinc isobutylisoamyl, dibutyl tin diacetate, di-n-butyl tin dimaleate, di-n-butyl tin dioxide, triphenyl tin acetate, tri-n-butyl tin oxide, dioctyl tin dilaurate, tributyl tin acetate, tributyl tin chloride, tin tetraamyl, diallyl tin dichloride, methylvinyldichlorosilane, octadecyldimethyl ammonium chloride, ferrocene, or titanocene dichloride.

25. An adhesive system according to claim 7 wherein said organometallic compound of the formula

M—X—R is n-dodecylmercaptopotassium salt, aluminum trithiobutoxide, tin 2-ethylhexanemonothioate, zinc 2-ethylhexanedithioate, nickel dimethyldithiocarbamate, copper dimethyldithiocarbamate, iron dimethyldithiocarbamate, zinc diethyldithiocarbamate, nickel benzenesulfonate, vanadium dibutylphosphate or zinc mercaptobenzothiazole.

26. An adhesive system according to claim 1 wherein said organometallic compound is dispersed or dissolved in an organic solvent.

27. An adhesive system according to claim 26 wherein said organic solvent is 1,1,2-trichloro-1-2,2-trifluoroethane, ethanol, acetone, ethyl acetate, 1,1,1-trichloroethane, tetrahydrofuran, 1,4-dioxane or toluene.

28. An adhesive system according to claim 26 wherein said organometallic compound is present in an amount of 0.001–20% in said organic solvent.

29. An adhesive system according to claim 26 wherein the viscosity of the primer is in the range about 2–5000 cp at 25° C.

30. An adhesive system according to claim 1 which additionally contains an organic polymer.

31. An adhesive system according to claim 3 wherein said organic polymer is selected from the group consisting of an olefinic copolymer, a chlorinated olefinic polymer, a vinyl polymer and a synthetic rubber.

32. An adhesive system in accordance with claim 30 wherein said organic polymer is present in said primer in an amount in the range 0.1–20% by weight.

* * * * *